(No Model.)
W. RICHARDS.
GUDGEON FOR DRILLING MACHINE SAND REELS.
No. 415,925. Patented Nov. 26, 1889.
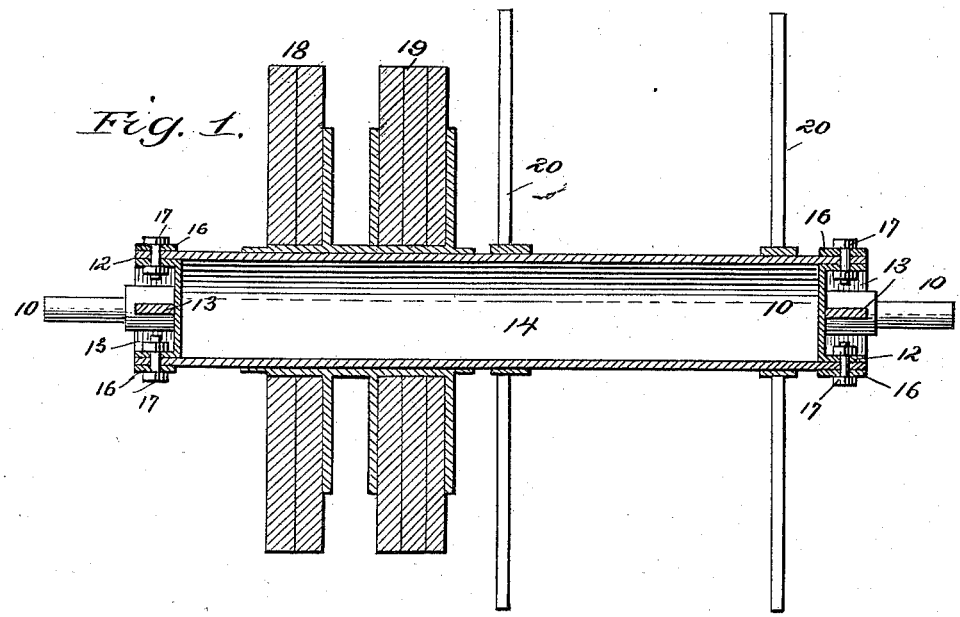
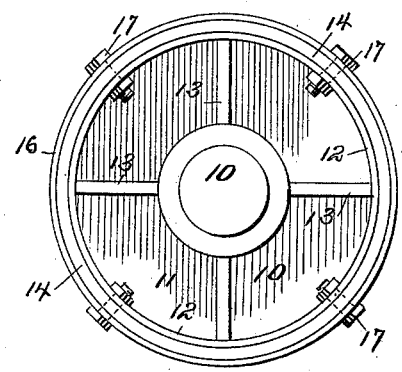
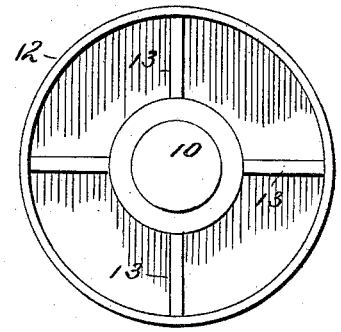
WITNESSES:
INVENTOR:
W. Richards
BY
Munn & Co.
ATTORNEYS.

UNITED STATES PATENT OFFICE.

WILLIAM RICHARDS, OF MAYBURG, PENNSYLVANIA.

GUDGEON FOR DRILLING-MACHINE SAND-REELS.

SPECIFICATION forming part of Letters Patent No. 415,925, dated November 26, 1889.

Application filed August 1, 1889. Serial No. 319,407. (No model.)

*To all whom it may concern:*

Be it known that I, WILLIAM RICHARDS, of Mayburg, in the county of Forest and State of Pennsylvania, have invented a new and Improved Gudgeon for Drilling-Machine Sand-Reels, of which the following is a full, clear, and exact description.

My invention relates to an improved gudgeon for drilling-machine sand-reels, and has for its object to provide a gudgeon of simple, light, and durable construction, which will effectually prevent the ends of the tubular reel-shaft from splitting, and wherein, also, the gudgeon will be held securely locked to the said shaft under the severest pressure brought to bear upon the friction-pulleys of the reel.

The invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a central vertical section through a reel-shaft having my improved gudgeons applied. Fig. 2 is an end view of the shaft; and Fig. 3 is an end view of the gudgeon detached.

The gudgeon 10 is formed integral with or attached to a disk 11, provided with an annular peripheral flange 12, the contiguous surfaces of the flange and gudgeon being connected by ribs 13, which ribs may, and preferably do, constitute a portion of the outer face of the disk. The gudgeon thus formed is inserted in the end of a tubular reel-shaft 14, and when so inserted constitutes heads for the shaft, the diameter of the disks and flanges being such that they completely close the shaft at its ends, and the outer edge of the flanges is preferably made to terminate flush with the extremities of the shaft. A ferrule 16, consisting of a metal ring or band, is screwed, shrunk, or otherwise secured upon the periphery of the reel-shaft at each of its extremities, and bolts 17 are passed through the ferrules, the shaft, and the flanges of the gudgeons, and upon the inner ends of the bolts suitable nuts are screwed, or the bolts may be substituted by rivets or other equivalent fastening devices.

In Fig. 1 I have illustrated friction-pulleys 18 and 19 as secured upon the reel-shaft, and have also illustrated the reel-arms 20 applied to the shaft.

It will be observed from the foregoing construction that it is utterly impossible for the extremities of the shaft to split, which frequently happens under the old construction, as the ends are thoroughly clamped and held between the flanges of the gudgeons and the ferrules surrounding the shaft. It will also be observed that the parts may be made very light and yet possess a maximum amount of strength, and that the gudgeons may be quickly and conveniently applied to any tubular shaft.

Having thus described my invention, I claim as new and desire to secure by Letters Patent—

1. The combination, with a tubular shaft, of a disk provided with an annular peripheral flange inserted in the end of the said shaft, a trunnion projected outward from the disk at the flanged side, and a ferrule, band, or ring secured to the periphery of the shaft above the flange of the disk, substantially as shown and described.

2. The combination, with a tubular shaft, of a gudgeon comprising a disk inserted in one end of the shaft, a trunnion projected at a right angle outward from the disk, an annular flange integral with the periphery of the disk surrounding the trunnion, and a ferrule, band, or ring securely held upon the periphery of the shaft above the flange of the disk, and means, substantially as shown and described, for uniting the ferrule, ring, or band, the shaft, and the flange of the disk, all combined for operation, as and for the purpose specified.

WILLIAM RICHARDS.

Witnesses:
E. M. SANDY,
H. M. POWERS.